Dec. 31, 1963    M. R. OVERBYE    3,115,756
METHOD AND APPARATUS FOR FREEZING FOODS
Filed Nov. 13, 1961    4 Sheets-Sheet 1
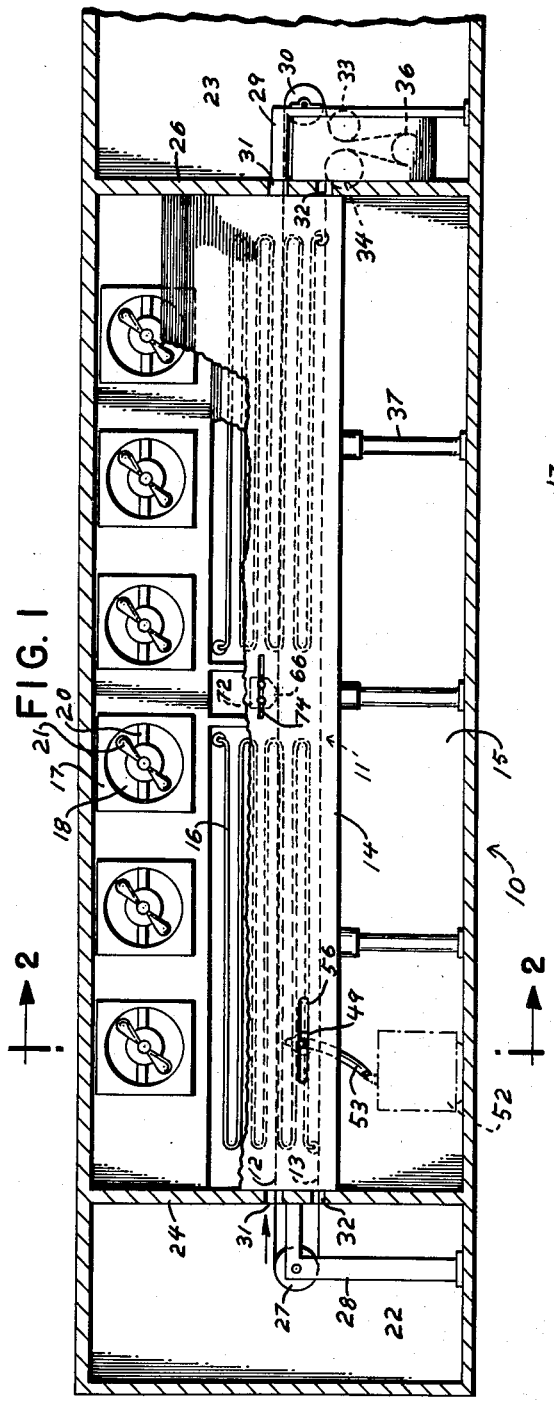
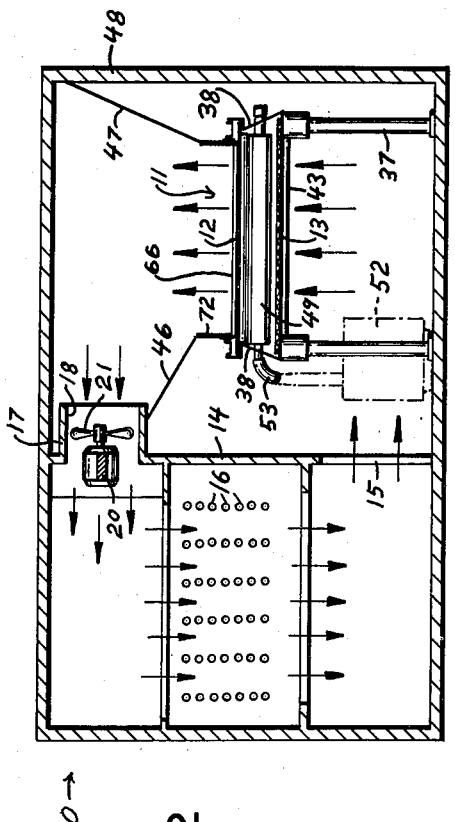
INVENTOR.
MILAN R. OVERBYE
BY Barnes & Seed
ATTORNEYS

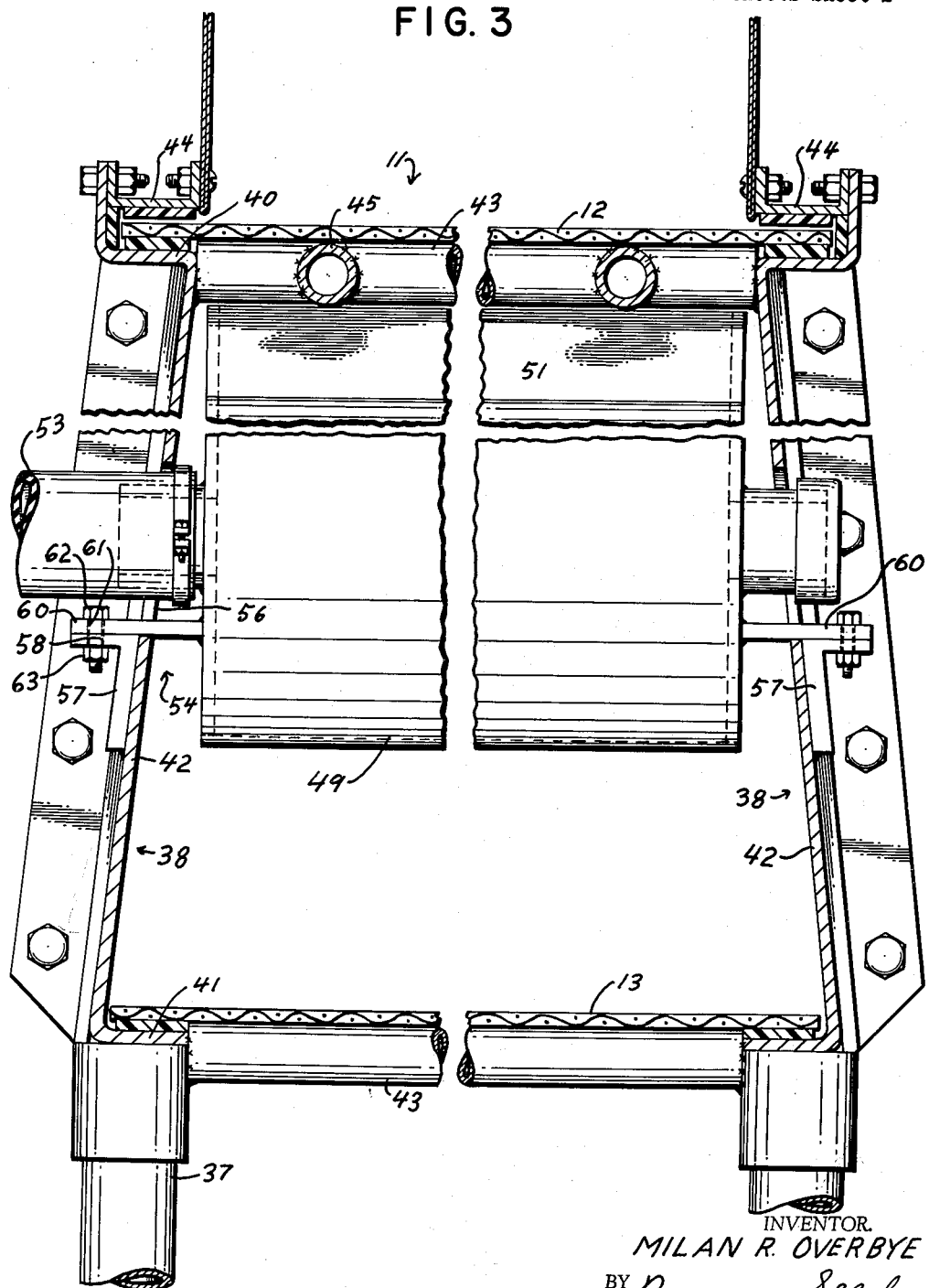

INVENTOR.
MILAN R. OVERBYE
BY Barnes & Seed
ATTORNEYS

Dec. 31, 1963 M. R. OVERBYE 3,115,756
METHOD AND APPARATUS FOR FREEZING FOODS
Filed Nov. 13, 1961 4 Sheets-Sheet 4

INVENTOR.
MILAN R. OVERBYE
BY Barnes & Seed
ATTORNEYS

United States Patent Office 3,115,756
Patented Dec. 31, 1963

3,115,756
METHOD AND APPARATUS FOR FREEZING FOODS
Milan R. Overbye, Seattle, Wash., assignor to Lewis Refrigeration Co., Seattle, Wash., a corporation of Washington
Filed Nov. 13, 1961, Ser. No. 151,787
13 Claims. (Cl. 62—57)

This invention relates generally to refrigeration and more particularly to a method and apparatus for freezing comestibles such as peas, corn, potatoes and the like, preparatory to packaging for later consumption.

For several reasons it is desirable to freeze the comestibles in a manner such that each particle is separate and free of the others, with a coat of frozen surface moisture enveloping each particle. In this state, the packaging of the comestibles is greatly simplified. Further, the consumer is able to unpackage the comestibles or pour the desired portion from the package with ease. With regard to the quality of food itself, a thin coat of ice about each particle acts to preserve the proper moisture content within the food particle.

Another advantage in keeping the particles separate during freezing is that the freezing process itself is greatly facilitated. The freezing must be accomplished by exposing the comestibles to some cooling medium, generally refrigerated air. If the particles freeze into clumps so that the cooling air is precluded from reaching the unexposed food particles in the centers of the clumps, the rate of heat transfer from such unexposed particles is significantly reduced, which for complete freezing would necessitate an undesirable lengthening of the exposure time of such comestibles to the cooling medium.

In a patent to Sterling, No. 2,223,972, there is disclosed a basic approach to this problem of properly freezing comestibles. In the apparatus of this patent, the comestibles are carried on a wire mesh conveyor which has refrigerating coils located between the upper and the lower run of the conveyor. Air is blown through the refrigerating coils and upwardly through the upper run of the conveyor, which causes the comestibles (in the words of the patent disclosure) "to float or remain in suspension a slight distance above the conveyor," so that the comestibles tend to freeze as separate particles. The entire apparatus is enclosed in several insulated compartments.

With an apparatus of this general type, there are difficulties in attempting to obtain a high percentage of properly frozen comestibles and yet maintain a reasonably high output. If each particle is to be given sufficient cooling time in the freezing chamber or tunnel, the output of a given apparatus can be increased a significant amount only by loading the belt more heavily. To maintain the flotation or suspension of the comestibles at this increased depth of loading, the air must be pushed at an increased pressure up through the belt. But above a certain pressure level (this level depending upon the size, shape, density, etc., of the particles of the particular comestible), there is a tendency for what was formerly a uniform blanket of suspended particles to "erupt" or "blow through," leaving pockets similar to miniature volcanic cones with the food particles being blown aside and the air beneath the conveyor funneling through the resulting holes relatively unobstructed. A pressure reduction occurs near each of such pockets, with the food particles adjacent the "blow-out" freezing into clumps.

Another consideration is the proper loading of the comestibles onto the conveyor belt. When the comestibles once become properly suspended by the rising air current, the food particles tend to distribute themselves with uniform thickness over the conveyor. However, if the comestibles are initially piled too deeply in any one area of the belt, the pressure of the rising air is ordinarily insufficient to suspend the comestibles so piled, which then tend to freeze in large clumps.

Adaptability of the freezing apparatus is also of great importance, the same apparatus being required at different times to process, for example, peas, then corn, etc. Since some comestibles comprise particles of a size, density, etc., quite different from others to be frozen, certain functional portions of the apparatus must be adjusted to obtain maximum output of properly frozen comestibles.

It is in view of these aforementioned considerations that the apparatus and method of the present invention were conceived, a general object of such apparatus and method being to provide for the freezing of comestibles, or the like, in such a manner that the comestibles are frozen as separate and free particles, which may be conveniently removed from the freezing apparatus and packaged.

Ancillary to the above is another general object of providing a method and apparatus which produces frozen comestibles of consistently high quality, i.e. frozen at the proper rate to the desired temperature, with each particle having the desired coating of frozen surface moisture and having the proper moisture content locked within.

It is also the general purpose of the invention to accomplish the aforementioned objects and yet achieve a relatively high output for a given apparatus, and also to effect an economy with respect to the power consumed per unit of output.

Along with these prior objects is that of providing a method and apparatus which is readily able to meet the various freezing requirements of a wide variety of comestibles.

It is also an object to accomplish the foregoing objects in a simple, inexpensive, and reliable manner.

It is a more particular object of both the process and apparatus of this invention to properly provide for a localized "loose phase suspension" of the comestibles, so as to aid in achieving the foregoing objects.

It is further desired to provide means to obstruct and thus divert the flow of comestibles, also to further the accomplishment of the foregoing objects.

Other more particular objects and advantages will appear and be understood in the course of the following description and claims, the invention consisting in the novel construction and in the adaptation and combination of parts hereinafter described and claimed.

In the accompanying drawings:

FIGURE 1 is a longitudinal sectional view of a freezing tunnel embodying preferred teachings of my invention;

FIG. 2 is a transverse sectional view thereof;

FIG. 3 is a fragmentary transverse sectional view of a conveyor, with a jet tank mounted therein;

Figure 4:
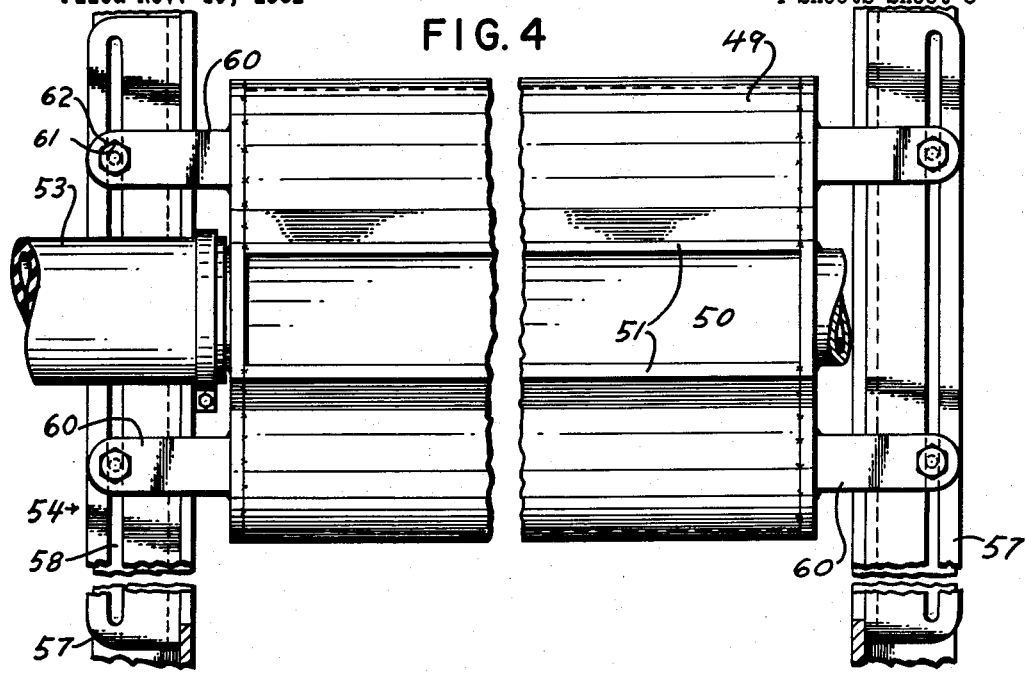
FIG. 4 is a fragmentary top plan view of said jet tank.
Figure 5:
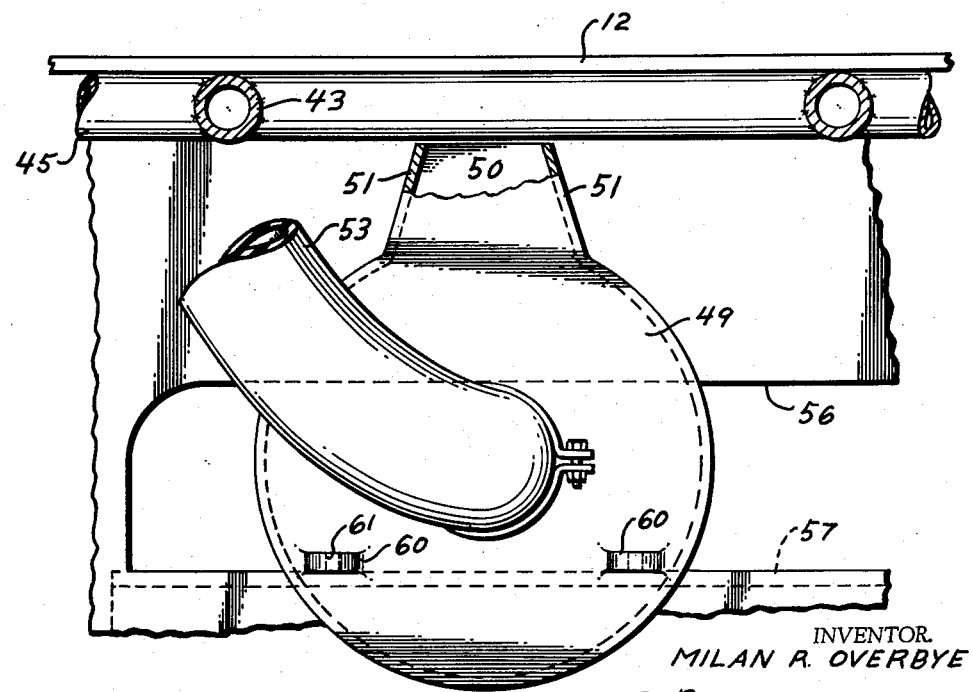
FIG. 5 is a fragmentary side elevational view of the apparatus of FIG. 4.
Figure 6:
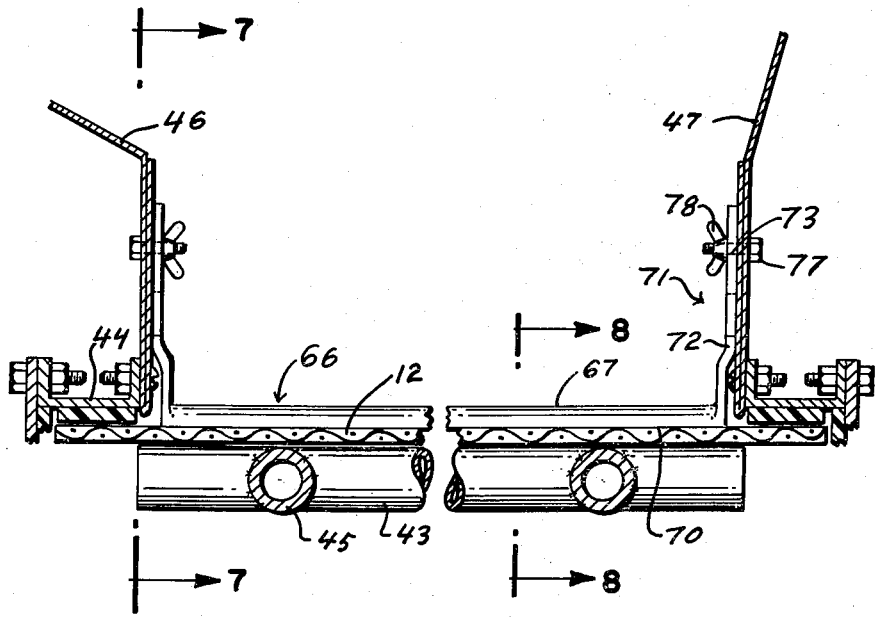
FIG. 6 is a fragmentary transverse sectional view of the upper conveyor run, showing an obstructing plate mounted thereabove.
Figure 7:
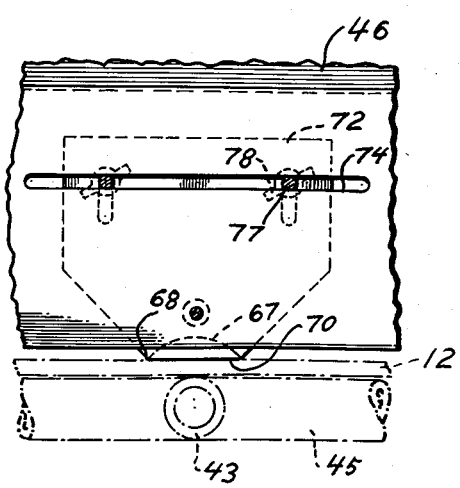
FIG. 7 is a fragmentary side elevational view, partly in section, taken on line 7—7 of FIG. 6.
Figure 8:
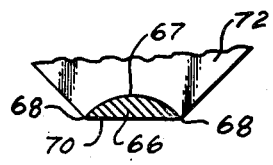
FIG. 8 is a fragmentary sectional view taken on line 8—8 of FIG. 6.

Referring to the accompanying drawings, numeral 10 designates a freezing tunnel having substantial length and being in transverse section of a generally uniform rectangular shape. To carry comestibles through the tunnel, there is provided a foraminous conveyor 11 (desirably made of wire mesh) extending the length of the tunnel and having an upper and lower run 12 and 13, respectively. The tunnel is partitioned by a longitudinal vertical wall 14 that depends from the ceiling of the tunnel and extends along the approximate center line thereof. The conveyor is located (as viewed in rear elevation) to the right of this wall, at the tunnel's approximate mid-height, while to the left of the partition wall also at about the mid-height of the tunnel and extending substantially the entire length thereof, is a plurality of refrigerating coils 16.

The lower edge of the partition wall is spaced from the tunnel floor to form a large lower opening 15 extending the length of the tunnel, through which opening air may pass freely from below the refrigerating coils to beneath the conveyor belt. Along the length of the upper portion of the partition wall are several evenly spaced box-like housing structures 17, each of which defines one of a number of horizontal transverse through-openings 18, in each of which is mounted by suitable struts 20 one of an equal number of circulating fans 21. Each of these fans rotates on a transverse horizontal axis so as to draw air from above conveyor 11, the effect of this being to circulate the air in a direction which (as viewed in rear elevation) is generally counter-clockwise, with the air thus passing downwardly through the refrigerating coils 16 and upwardly through the conveyor 11.

There is a loading chamber 22 at the rear of the tunnel and at the front thereof is a discharge chamber 23. Each of these chambers is separated from the tunnel by a related one of two transverse bulkheads 24 and 26, one closing the rear end and the other the front end of the tunnel. The rear of the conveyor belt reaches into the loading chamber 22 where it curves in a 180° arc to train over an idler roller 27 that is carried in said chamber by a suitable supporting frame 28. The front end of the conveyor extends into the discharge chamber 23, where it frictionally engages in a similar 180° arc a live roller 30 that is turned by a suitable power mechanism (not shown), and carried by a suitable frame 29. Upper and lower horizontal slot openings 31 and 32 are provided in each of the bulkheads 24 and 26 to permit the travel therethrough of, respectively, the upper and lower conveyor runs 12 and 13.

To keep the conveyor belt properly taut, there is provided two longitudinally spaced guide rollers 33 and 34, located a short distance behind the live roller 30 with the upper surface of each being tangent to the lower belt run 13. Located below said guide rollers and on a transverse plane therebetween is a tension roller 36 which is pressed downwardly by a suitable spring mechanism (not shown). As the lower run of the conveyor leaves the live roller 30, it trains over the front guide roller 33, thence downwardly and around the lower tension roller 36, and then upwardly over the rear guide roller 34, wherefrom it continues rearwardly on the path of the lower belt run.

The supporting structure for the upper and lower runs 12 and 13 within the tunnel comprises several columns 37 which carry two longitudinal frame sections 38, located on opposite sides of the belt. These frame sections are, in transverse section, of a Z configuration, the upper and lower flange portions 40 and 41 of the Z carrying, respectively, the upper and lower belt runs 12 and 13, and the web portion 42 of each frame reaching from the outer edge of the lower flange to the inner edge of the upper flange. Beneath each conveyor run, and providing vertical support therefor, is a plurality of suitably arranged crossbars 43, reaching between the Z frames, and interconnected by longitudinal struts 45. The upper flanges 40 of the frame sections are each formed with a cover piece 44 which defines with its related flange one of two opposed channels to receive in tracking relationship a related edge of the upper conveyor run 12.

Diverging upwardly from each of these channels 44 is one of two longitudinal side walls 46 and 47 which define a large trough, having the upper conveyor run 12 as its base. The upper edges of these walls reach, one to the partition wall 14, and the other to the adjacent side wall 48 of the tunnel. This trough arrangement serves to return to the belt any food particles which may be blown off the belt, and also to block the air from the refrigerating coils 16 so that such air is directed upwardly through both conveyor runs 12 and 13.

Adjustably mounted between the upper and lower runs of the rear conveyor portion is a cylindrical jet tank 49 having an upwardly directed spread nozzle in the form of a longitudinal slot opening 50. This slot opening is located immediately below, and extends transversely to, the upper conveyor run 12, reaching the entire width thereof. Upstanding from each edge of this slot opening is a related one of two choking flanges 51 which serve to direct the air from the slot opening in a moderately diverging air stream, so as to pass through the upper conveyor run along a transverse strip thereof. Air under pressure is fed to the tank 49 from a suitable compressor, shown schematically at 52, by means of a flexible air hose 53.

The tank 49 is so mounted that its location with respect to the longitudinal axis of the belt can be readily adjusted. Such a mounting arrangement is or may be of a type shown at 54, which comprises two longitudinal slots 56, located one in each Z-frame 38 with an angle iron 57 welded to its related Z-frame immediately below the frame slot 56. Formed in the horizontal flange of each angle iron is a longitudinal slot 58. Two pairs of ears 60 extend laterally, one pair from each base end of the cylindrical tank 49, through a related frame slot 56. Each of the ears have perforations 61 registering with its related angle iron slots 58 so as to accommodate a bolt 62, which with its related nut 63 serves to fix the tank at its desired location.

At approximately the mid-length of the upper belt run 12, and extending the width thereof is a transverse obstructing bar 66. This bar is uniform in transverse section, and is formed with a moderately convex upper surface 67 that meets along two edge lines 68 the flat base surface 70 of the bar. This base surface bears against the top surface of the upper conveyor run 12.

This bar 66 also has a mounting which is adjustable with respect to the longitudinal axis of the conveyor, which mounting is or may be of a type shown at 71, and comprises two arms 72, upstanding from opposite ends of the bar 66. Each arm has two holes 73 registering with a related one of two slots 74, each formed in one of the side walls 46 and 47. In each of these holes 73 is a bolt 77 which, with its related wing nut 78, is used to fix the location of the bar with respect to the longitudinal axis of the conveyor.

In operation, the comestibles are either manually or mechanically loaded onto the rear portion of the upper conveyor run 12, the rate of loading being consistent with the overall capacity of the apparatus. The speed of the fans 21, circulating the air in the tunnel in the aforedescribed counterclockwise direction, i.e. down through the refrigerating coils and upwardly through the conveyor 11, is adjusted in relation to the type of comestibles in the tunnel to the depth of loading on the belt, etc. To explain this latter statement more fully, the force exerted by the rising air should be just sufficient to create what can be appropriately termed a "dense-phase suspension" of the comestibles. That is to say, the comestible particles are just suspended over the belt, with the particles being fairly close to one another. There is little turbulence, and the particles form a fairly uniform blanket which exhibits a slight rippling or wave action suggestive of mild wave action of a liquid surface.

The comestibles being loaded onto the belt have previously been processed so that the particels come into the tunnel with a fair amount of surface moisture. After a rather moderate exposure time in the tunnel, the surface moisture begins to freeze, this being a state in which the surface of the particles becomes quite adherent. It is during this time period that the belt carries the comestibles over the stream of air emitted through the slot opening 50 of the tank 49.

The air stream from this tank 49 is at a velocity considerably higher than that of the air circulating upwardly under the rest of the conveyor, and creates an increased lifting force which throws the comestibles upward in what is termed a "loose-phase suspension." In this state the comestible particles are lifted in a more turbulent manner to a height of several inches to a foot or more, this action tending to separate any particles which may have begun to adhere to each other or to the belt. Further, any of the particles which were initially piled too deeply so as to resist any suspending action of the circulating air, by virtue of this localized loose-phase suspension, become redistributed in a uniform blanket, and then continue along the course of the upper belt run in a state of dense-phase suspension.

At approximately the mid-length of the tunnel the upper run 12 of the conveyor passes under the obstructing bar 66. Since the front edge 68 of the bar is contiguous to the upper surface of the belt run 12, the comestibles are forced to move over the bar's upper convey surface 67. This causes a certain unsettling action to break up any clumps of comestibles which may have formed, and to separate from the conveyor any particles which may have become frozen thereto. It should be noted that by the time the comestibles have reached the approximate mid-length of the tunnel, they have acquired a protective frozen crust which prevents any damage from the obstructing bar 66.

It is readily apparent that since the location of both the jet tank 49 and the bar 66 depend upon many factors, including the type of comestibles, the rate of output of the tunnel, the depth of the loading, the rate of freeing, etc., both the tank and the bar should be mounted in a manner to be adjustable along the longitudinal axis of the conveyor. Since in actual practice, it might be desired to make adjustments during an operating cycle, it could well be found advantageous to provide means operable from without the tunnel to move the bar or tank to precisely the desired location.

Changes in the details of construction may be resorted to without departing from the spirit of the invention and it is accordingly my intention that no limitations be implied and that the hereto annexed claims be given the broadest interpretation to which the employed language fairly admits.

What I claim, is:

1. A process for the freezing of comestibles and the like in preparation for later consumption, comprising, carrying said comestibles by means of a conveyor on a course through a freezing zone, directing a cooling medium upwardly through said conveyor and through said comestibles so as to create a dense-phase suspending action with respect to said comestibles and to freeze said comestibles, providing near the location in said course at which the surface portion of said comestibles is beginning to freeze, an upwardly directed gaseous flow of relatively higher intensity so as to create a relatively turbulent loose-phase suspension of said comestibles, after which said first named cooling medium continues to freeze said comestibles through the remainder of said course.

2. A process for the freezing of comestibles and the like in preparation for later consumption, comprising, carrying said comestibles by means of a conveyor on a course through a freezing zone, directing a cooling medium upwardly through said conveyor and through said comestibles so as to create a dense-phase suspending action with respect to said comestibles and to freeze said comestibles, providing, near the location in said course at which the surface portion of said comestibles is beginning to become adherent, an upwardly directed gaseous flow of relatively higher intensity so as to create a turbulent loose-phase suspension of said comestibles, so that said comestibles are lifted from said conveyor in such a manner as to disturb adhering action of the surface portion of said comestibles, after which turbulent suspension, said first named cooling medium continues to freeze said comestibles through the remainder of said course.

3. In an apparatus to freeze comestibles and the like in preparation for later consumption, a foraminous conveyor to carry said comestibles on a predetermined course, means to direct a gaseous cooling medium upwardly through said conveyor so as to create a dense-phase suspending action with respect to said comestibles and to freeze said comestibles as they are carried by said conveyor along said course, means to direct at a selected localized area of said course a gaseous medium upwardly through said conveyor at a relatively high velocity so as to cause a turbulent loose-phase suspending action with respect to said comestibles, said last named means being adapted to be located with respect to said conveyor so that the turbulent suspension may be accomplished at a course location at which the surface portion of said comestibles is beginning to freeze, so as to accomplish the proper freezing of said comestibles as separate particles.

4. The apparatus as recited in claim 3, wherein said last named means is adjustable longitudinally with respect to said conveyor so that said last named means may be properly located in accordance with the freezing requirements of the particular comestibles.

5. The apparatus as recited in claim 4, wherein said last name means provides a nozzle which so directs air that said selected localized area extends transversely across the course defined by said conveyor so that said turbulent suspending means properly acts on substantially all the comestibles travelling over said conveyor.

6. The apparatus as recited in claim 3, wherein said last named means comprises a member having a transverse slot and containing a gaseous medium, said member being located below the conveyor portion carrying said comestibles, means to impel said medium under pressure through said slot, said slot being disposed so as to direct said medium upwardly through said conveyor so as to accomplish said loose-phase suspension along an area extending transversely across the course defined by said belt.

7. In an apparatus to freeze comestibles and the like in preparation for later consumption, a foraminous conveyor to carry said comestibles on a predetermined course, means to direct a gaseous cooling medium upwardly through said conveyor so as to create a suspending action with respect to said comestibles and to freeze said comestibles as they are carried for by said conveyor along said course, an obstruction overlying said conveyor and crossing said course at a selected location, said obstruction presenting a surface portion slanting upwardly in the direction of travel of said comestible from the carrying surface of said conveyor so that comestibles traveling said course are diverted upwardly from said conveyor surface at said selected location, said location being at a locus in said course where the surface of said comestibles are frozen to the extent that a protective crust is formed on said comestibles, so that said obstruction does not damage said comestibles, but acts to break up clumps into which said comestibles may have formed.

8. An apparatus to freeze comestibles and the like in preparation for later consumption, comprising, a tunnel to define a freezing zone, a foraminous conveyor to carry said comestibles through the freezing zone of said tunnel, means to cool the atmosphere within said tunnel, means to circulate said atmosphere so as to direct a current of said atmosphere upwardly through said conveyor with such a velocity as to accomplish a dense phase suspension of said comestibles through at least a substantial portion of said freezing zone, an obstruction overlying said conveyor and crossing said course at a selected location, the lower side of said obstruction presenting a generally flat surface portion adjacent said conveyor to limit upward movement of said conveyor, the upper side of said obstruction presenting in transverse section a generally convex surface so that said obstruction presents a surface portion slanting upwardly in the direction of travel of said comestibles from the carrying surface of said conveyor so that comestibles travelling said course are diverted upwardly from said conveyor surface at said selected location, said location being at a locus in said course where the surface portions of said comestibles are frozen to the extent that a protective crust is formed on said comestibles, so that said obstruction does not damage said comestibles, but acts to break up any clumps of said comestibles which may have formed on said conveyor.

9. In an apparatus to freeze comestibles and the like in preparation for later consumption, a foraminous supporting means for said comestibles, means to convey said comestibles on a predetermined course, means to direct a gaseous cooling medium upwardly through said supporting means so as to create a dense-phase suspending action with respect to said comestibles and to freeze said comestibles as they are carried along said course, means to direct at a selected localized area of said course a gaseous medium upwardly through said supporting means at a relatively high velocity so as to cause a turbulent loose-phase suspending action with respect to said comestibles, said last named means being adapted to be located with respect to said supporting means so that the turbulent loose-phase suspension may be accomplished at a course location at which the surface portions of said comestibles is becoming adherent, so as to accomplish the proper freezing of said comestibles as separate particles.

10. A process for the freezing of comestibles and the like in preparation for later consumption, comprising, carrying said comestibles by means of a conveyor on a course through a freezing tunnel, directing through substantially the entirety of said course, a gaseous cooling medium upwardly through said conveyor and through said comestibles at a velocity sufficient to create a dense phase suspending action with respect to said comestibles and to freeze said comestibles, providing near the location in said course at which the surface portions of said comestible is beginning to freeze and upwardly directed gaseous flow at a velocity higher than said first named velocity so as to create a relatively turbulent loose-phase suspension of said comestibles.

11. An apparatus to freeze comestibles and the like in preparation for later consumption, comprising, a tunnel to define a freezing zone, a foraminous conveyor to carry said comestibles on a course through the freezing zone of said tunnel, means to cool the atmosphere within said tunnel, means to circulate said atmosphere in the tunnel so that a current of said atmosphere is directed upwardly through substantially all of the conveyor traveling said course at such a velocity as to accomplish a dense phase suspension of said comestibles, means to direct upwardly a gaseous stream at a localized area of said course, said stream being of such an increased velocity as to create a localized loose-phase suspension of said comestibles, said last named means being so located as to accomplish this loose-phase suspending action at a point where the surface of the comestibles is beginning to freeze.

12. The apparatus as recited in claim 11, wherein said last named means comprises a tank containing air under pressure and having a discharge opening to direct said air upwardly through said conveyor and means to supply air under pressure to said tank.

13. In an apparatus to freeze comestibles and the like in preparation for later consumption, a foraminous conveyor to carry said comestibles along a generally horizontal predetermined course, means to direct a gaseous cooling medium upwardly through said conveyor so as to create a suspending action with respect to said comestibles and to freeze said comestibles as they are carried by said conveyor along said course, a shallow obstruction closely overlying said conveyor and crossing said course intermediate the ends of said course whereby comestibles carried along said course by said conveyor are diverted upwardly over said obstruction.

References Cited in the file of this patent

UNITED STATES PATENTS

| 1,778,318 | Haas | Oct. 14, 1930 |
| 2,223,972 | Sterling | Dec. 3, 1940 |

FOREIGN PATENTS

| 1,113,862 | Germany | Sept. 14, 1961 |